J. SEAMAN.
Clothes-Wringers.
No. 144,705. Patented Nov. 18, 1873.
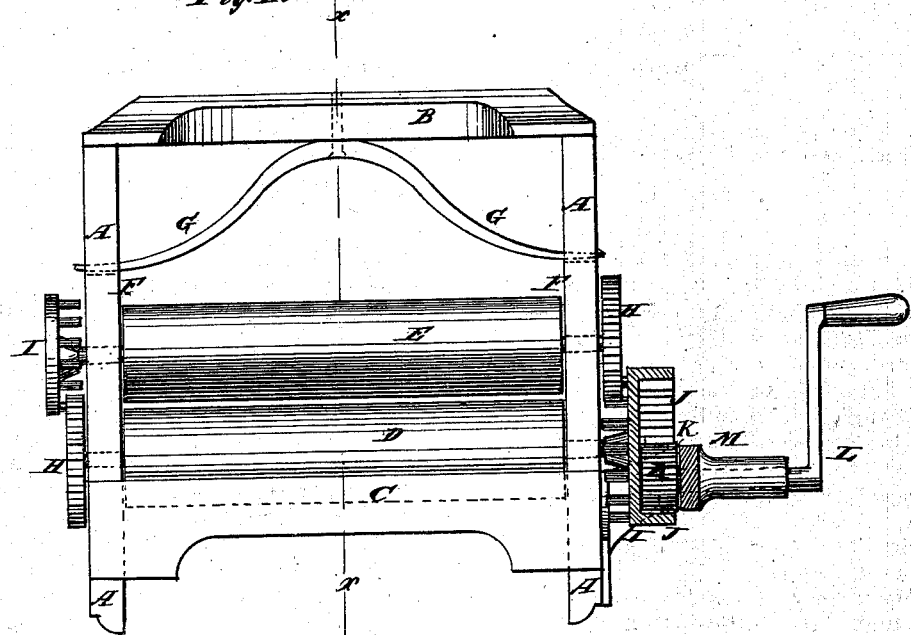
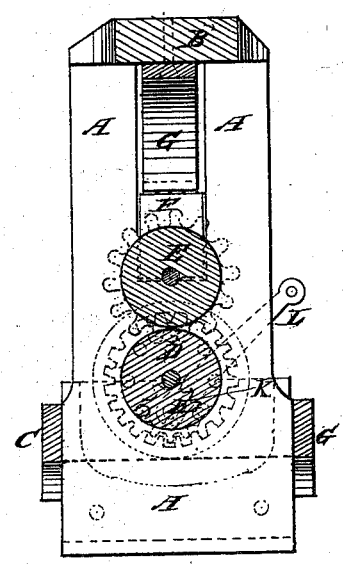

UNITED STATES PATENT OFFICE.

JOHN SEAMAN, OF GROTON, NEW YORK.

IMPROVEMENT IN CLOTHES-WRINGERS.

Specification forming part of Letters Patent No. 144,705, dated November 18, 1873; application filed May 17, 1873.

*To all whom it may concern:*

Be it known that I, JOHN SEAMAN, of Groton, in the county of Tompkins and State of New York, have invented a new and useful Improvement in Clothes-Wringer, of which the following is a specification:

Figure 1 is a side view of my improved clothes-wringer, part being broken away to show the construction. Fig. 2 is a vertical cross-section of the same taken through the line $x\ x$, Fig. 1.

Similar letters of reference indicate corresponding parts.

My invention has for its object to furnish an improved clothes-wringer, which shall be so constructed that the rolls may work closer together without binding, and farther apart without getting out of mesh, than ordinary wringers, and which shall have an increased power, or, in other words, will require a less power to operate it while applying an equal amount of pressure.

A are the standards or ends of the wringer, the upper ends of which are connected by a bar, B, and their lower ends by the bars or boards C, which also serve as guard-boards to the clothes. D is the lower roll, and E is the upper roll. The journals of the rolls D E work in slots in the standards A, and upon the journals of the upper roll are placed half-bearings F, upon which rest the ends of the curved spring G, the middle part of which is attached to the top bar B. To one journal of each roll D E is attached a gear-wheel, H, the teeth of which mesh upon a circle of pins or cogs attached to the side of a disk or wheel, I, attached to the other journals of the rolls D E.

The gearing H I, thus constructed, gives greater capacity to the machine, or allows the rolls to work closer together or farther apart without binding or getting out of gear than gearing constructed in the ordinary manner.

Upon the edge of the gear-wheel of the lower roll D is formed an outwardly-projecting flange, J, upon the inner surface of which are formed gear-teeth, into which mesh the teeth of the small pinion-wheel K, attached to the crank-shaft L, which works in a long bearing in a bracket, M, attached to the standard A.

This construction gives a greatly-increased power to the wringer, so that a lady can operate it, and apply sufficient pressure to the clothes, whose strength would not be sufficient to operate an ordinary wringer.

Having thus described my invention, I claim as new and desire to secure by Letters Patent—

The combination, with rolls D E, of the gear-wheels H I J K, and crank L, when all are constructed and arranged substantially as and for the purpose described.

JOHN SEAMAN.

Witnesses:
MELVIN H. FITCH,
E. S. BARNARD.